US010500956B2

(12) United States Patent
Crijns et al.

(10) Patent No.: US 10,500,956 B2
(45) Date of Patent: Dec. 10, 2019

(54) MOVEABLE DISPLAY SCREEN

(71) Applicant: McLaren Automotive Limited, Woking, Surrey (GB)

(72) Inventors: Steve Crijns, Chilworth (GB); Emilio Scervo, Weybridge (GB)

(73) Assignee: McLaren Automotive Limited, Woking (GB)

(*) Notice: Subject to any disclaimer, the term of this patent is extended or adjusted under 35 U.S.C. 154(b) by 0 days.

(21) Appl. No.: 15/797,730

(22) Filed: Oct. 30, 2017

(65) Prior Publication Data

US 2018/0118031 A1    May 3, 2018

(30) Foreign Application Priority Data

Oct. 31, 2016    (GB) .................................. 1618391.5

(51) Int. Cl.
| | |
|---|---|
| *G09G 5/14* | (2006.01) |
| *B60K 37/02* | (2006.01) |
| *B60K 35/00* | (2006.01) |
| *G06F 3/14* | (2006.01) |
| *G09G 3/20* | (2006.01) |

(52) U.S. Cl.
CPC .............. *B60K 37/02* (2013.01); *B60K 35/00* (2013.01); *G06F 3/1446* (2013.01); *G09G 3/20* (2013.01); *G09G 5/14* (2013.01); *B60K 2370/152* (2019.05); *B60K 2370/1868* (2019.05); *B60K 2370/67* (2019.05); *B60K 2370/70* (2019.05); *G09G 2320/08* (2013.01); *G09G 2320/10* (2013.01); *G09G 2340/14* (2013.01); *G09G 2370/20* (2013.01); *G09G 2380/10* (2013.01)

(58) Field of Classification Search
CPC ..... G09G 5/14; G09G 2380/10; G06F 1/1601

USPC .................................................. 345/87; 349/1
See application file for complete search history.

(56) References Cited

U.S. PATENT DOCUMENTS

| 6,154,201 A * | 11/2000 | Levin ................. G01C 21/3664 |
| | | 345/156 |
| 2015/0006064 A1* | 1/2015 | Dextreit .............. F02N 11/0822 |
| | | 701/112 |
| 2016/0193924 A1* | 7/2016 | Kim ....................... G06F 1/1601 |
| | | 296/70 |

FOREIGN PATENT DOCUMENTS

| DE | 102013007356 A1 | 10/2014 |
| EP | 1083079 A2 | 3/2001 |
| EP | 2886385 A1 | 6/2015 |
| FR | 2970212 A1 | 7/2012 |

(Continued)

OTHER PUBLICATIONS

Intellectual Property Office, Search Report under 17(5) for Application No. GB1618391.5, dated Apr. 25, 2017, 4 pages, United Kingdom.

*Primary Examiner* — Calvin C Ma
(74) *Attorney, Agent, or Firm* — Alston & Bird LLP (57) ABSTRACT

A display assembly for a vehicle, the display assembly comprising: a housing; a display unit comprising a first display panel configured to display a first set of instruments and a second display panel configured to display a second set of instruments, the display unit being moveable, relative to the housing, between a first position and a second position; and a display unit controller being configured to, when the display unit is in the first position, cause the first display panel to display the first set of instruments and, when the display unit is in the second position, cause the second display panel to display the second set of instruments.

24 Claims, 4 Drawing Sheets

(56) References Cited

FOREIGN PATENT DOCUMENTS

| FR | 2971878 A1 | 8/2012 |
|---|---|---|
| WO | WO 2005/097539 A1 | 10/2005 |
| WO | WO 2015/131921 A1 | 9/2015 |

* cited by examiner

MOVEABLE DISPLAY SCREEN

CROSS REFERENCE TO RELATED APPLICATIONS

This application claims priority to and the benefit of United Kingdom Patent Application No. 1618391.5, filed on Oct. 31, 2016, the contents of which are hereby incorporated by reference in their entirety.

BACKGROUND

Related Field

This invention relates to a display assembly for a vehicle and a vehicle comprising such a display assembly.

Description of Related Art

Vehicles are usually fitted with one or more instrument panels to display information to the driver of the vehicle. The information is normally presented to the driver of the vehicle by one or more vehicle instruments. This information may be the operating status of the vehicle's systems, information concerning the operation of those systems and/or any errors or warnings associated with those systems. For example, a vehicle instrument may present the current speed of the vehicle, whether the vehicle's traction control is activated, or the current gear that is selected by the gearbox.

Vehicles are being fitted with an increasing large number of systems that need to present information to the driver of the vehicle. The instrument panels are usually located within or close to the normal field of view of the driver when operating the vehicle. For example, they may be located on or in the dashboard of the passenger compartment of the vehicle. The normal field of view of the driver when operating the vehicle is limited. Therefore, this can lead to a large number of vehicle instruments being clustered together in one or more instrument panels within or near that field of view.

It can be distracting to the driver to have a large number of vehicle instruments present within the driver's normal field of view. It can also make it difficult for the driver to locate a particular vehicle instrument during operating of the vehicle due to the large number of vehicle instruments that are clustered together in the instrument panel.

Having a large number of vehicle instruments located within the driver's normal field of view can be especially problematic when the vehicle is being driven enthusiastically or under race conditions. This is because the driver requires access to particular information during these situations to operate the vehicle with the required degree of control and skill. However, even during these situations it is desirable that the driver be alerted to problems or given particular information about the operation of the vehicle.

EP2886385 proposes that the vehicle be fitted with display elements that can be controlled to display different information dependent on the operating mode that the vehicle is in. For example, different information is displayed on the display elements depending on whether the operating mode of the vehicle is city mode, sport mode or off-road mode. However, even though different information is displayed on the display elements when the vehicle is operating in different modes, the display elements described in this document display a large number of vehicle instruments within the driver's normal field of view during operating modes where the driver may prefer to focus on the handling of the vehicle and the conditions of the road rather than being presented with lots of information.

There is therefore a need for an improved way of displaying vehicle information to the driver of the vehicle.

BRIEF SUMMARY

According to aspects of the present invention there are provided a display assembly and a vehicle as set out in the accompanying claims.

BRIEF DESCRIPTION OF THE FIGURES

The present invention will now be described by way of example with reference to the accompanying drawings. In the drawings.

DETAILED DESCRIPTION OF VARIOUS EMBODIMENTS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a display assembly for a vehicle. The display assembly comprises a housing and a display unit. The display unit is capable of moving relative to the housing between a first position and a second position. The display unit comprises a first display panel and a second display panel. The first display panel is configured to display a first set of vehicle instruments and the second display panel is configured to display a second set of vehicle instruments. The display assembly also comprises a display unit controller that is configured to cause the first display panel to display the first set of instruments when the display unit is in the first position. The display unit controller is also configured to cause the second display panel to display the second set of instruments.

Figure 1:
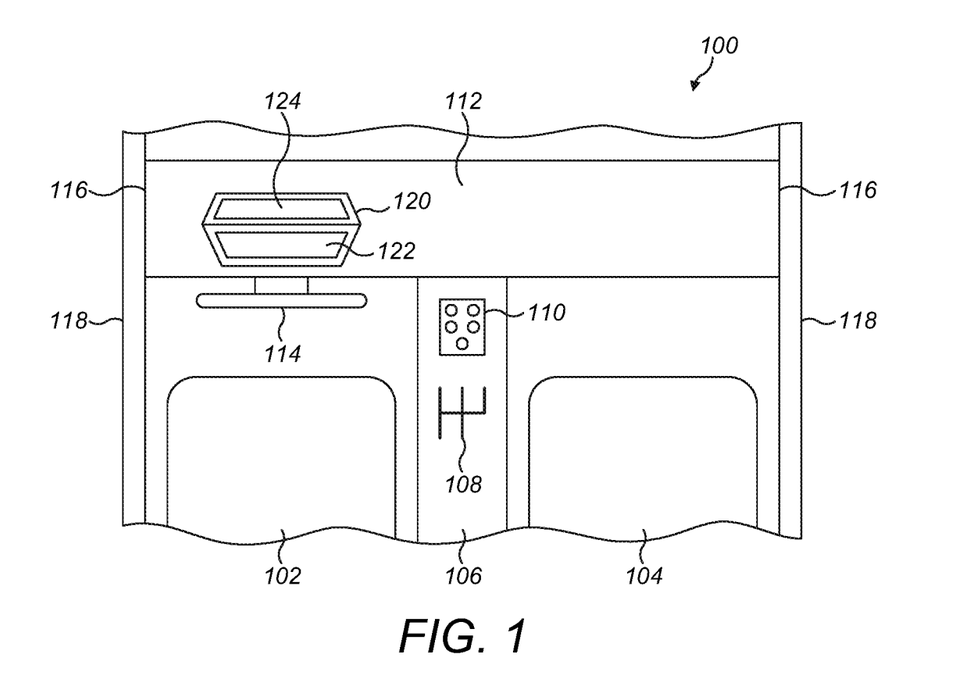
FIG. 1 shows a schematic drawing of a passenger compartment of a vehicle.

FIG. 1 shows a schematic plan of an interior of a vehicle 100. The vehicle 100 comprises a driver seat 102 and a passenger seat 104 that are spaced apart from each other by a central housing 106. The central housing 106 may house a transmission shaft or gearbox. In many cases, the central housing 106 may support a gear-stick 108 or other controls 110 that may be operated by the driver. The other controls 110 may permit the driver to select between more than one set of driving dynamics settings for the vehicle. For instance, a race mode, a sport mode and/or a normal mode. A dashboard 112 runs across the front of the interior of the car. The dashboard normally supports the steering wheel 114. Interior panels 116 mounted on body panels 118 define the lateral limits of the interior of the car. The dashboard 112 also supports a display unit 120. The display unit 120 is capable of functioning as the primary display 120 for the vehicle 100. The display unit 120 comprises a first display screen 122 and a second display screen 124. Each of the first display screen and the second display screen may each be capable of functioning, individually, as the primary display 120 of the vehicle 100.

The primary display 120 is typically used to display information concerning the operation of the vehicle 100 to the driver. The primary display 120 may display particular important, key, information concerning the operation of the vehicle. Such key information may be the current speed of the vehicle, the revolutions per second of the engine of the vehicle or the current engaged gear of the gearbox of the vehicle. The primary display 120 may also be defined by its position within the normal field of view of the driver. As shown in FIG. 1, it is generally located in or on the part of the dashboard 112 that is within the normal field of view of the driver. The normal field of view of the driver would usually be the area of the interior of the vehicle that can be viewed by the driver without excessive movement of the driver's head from a position where the driver can look out of the front windscreen of the vehicle. When operating the vehicle, the driver is likely to spend most of his time looking through the front windscreen of the vehicle. Therefore, it is most convenient if the main information that the driver is required to be presented with is located on a display located in front of the driver. The primary display 120 may be the largest display screen located in front of the driver. The location may also be defined relative to the driver seat 102, in that it is located in front of the driver seat 102 or generally closer to the driver seat 102 than the passenger seat 104. The primary display 120 may be located on or in the area of the dashboard located within lines running generally parallel with the lateral edges of the driver seat 102.

The display unit 120 will be described below in more detail with reference to FIGS. 2 and 3. The display unit 120 is configured to be capable of movement between two positions, a first position and a second position, relative to the dashboard 112 of the vehicle. The display unit 120 may be disposed in a housing that permits guidance of the display unit 120 between the first position and the second position. The housing may be part of the dashboard 112 of the vehicle. The housing may also be attached to the dashboard 112 of the vehicle. Therefore, the display unit 120 may also be described as being configured to be capable of movement between a first position and a second position relative to the housing.

Figure 2:
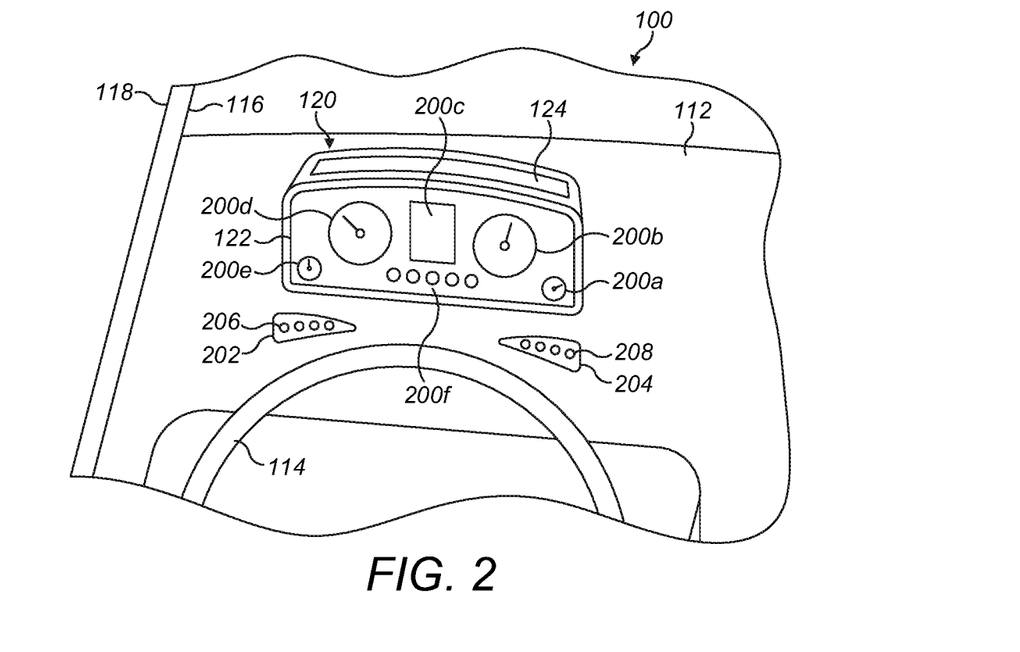
FIG. 2 shows a perspective view of the passenger compartment of the vehicle with a display unit in a first position.

The display unit 120 is shown in FIG. 2 as being located in the first position. In the first position the display unit 120 is orientated so that a first display screen 122 faces towards the driver seat, and thus the driver of the vehicle. In this first position the display unit 120 is orientated so that the first display screen 122 is in a position so as to be easily viewable by the driver of the vehicle. The first display screen 122 may be orientated so as to be generally perpendicular to the normal viewing direction of the driver.

As illustrated in FIG. 2, the first display screen is configured to display a first set of vehicle instruments 200a-200f. These vehicle instruments may each display information regarding the operation of the vehicle. The vehicle instruments may display dynamic information regarding the operation of the vehicle, for instance: the current speed of the vehicle, the current revolutions per unit time of the engine, the current gear engaged in the gearbox. The vehicle instruments may also display monitoring information regarding the operation of the vehicle, for instance: the current fuel level of the vehicle, the engine temperature, the oil pressure in the lubricant system of the vehicle. The vehicle instruments may also display warning information regarding the operation of the vehicle, for instance:

The vehicle instruments may comprise:
  A speedometer—an instrument that displays the current vehicle speed.
  A tachometer—an instrument that displays the current rotation speed of the engine.
  An odometer—an instrument that indicates the distance travelled by the vehicle
  A fuel level indicator—an instrument that indicates the level of fuel present in the vehicle's fuel tank.
  At least one warning light
  At least one indicator lights—an instrument that indicates whether one of the vehicle indicators are active.
  Current gear indicator—an instrument that indicates the current gear that is selected by the gearbox of the vehicle.
  Gear change indicator—an instrument that indicates a calculated optimum point in the engine's revolution speed range to change to another gear.
  Infotainment display—a display area which displays information about ancillary components of the vehicle. These ancillary components of the vehicle may comprise entertainment components such as a media player and/or a radio, and may comprise information components such as a navigation system and/or a vehicle statistics system. The vehicle statistics system may present running information about the vehicle such as average speed, vehicle range or trip distance covered.

The first display screen may be configured to display different sets of vehicle instruments at different times. In this case, the first display screen may be configured to display one of a group of first sets of vehicle instruments at a given time.

Figure 3:
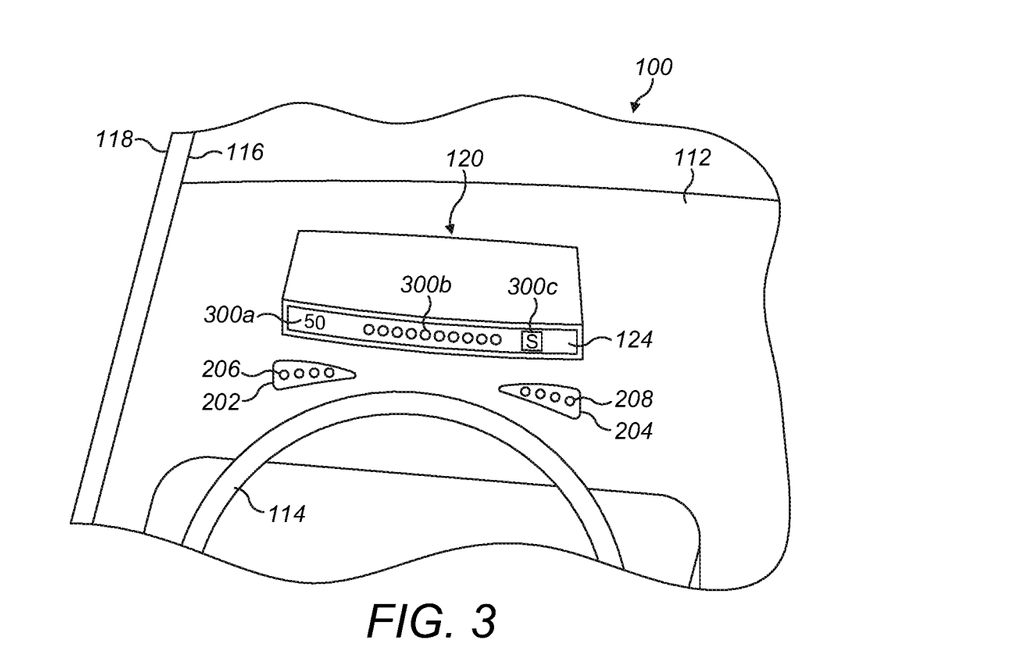
FIG. 3 shows a perspective view of the passenger compartment of the vehicle with the display unit in a second position.

The display unit 120 is shown in FIG. 3 as being located in the second position. In the second position the display unit 120 is orientated so that a second display screen 124 faces towards the driver seat, and thus the driver of the vehicle. In this second position the display unit 120 is orientated so that the second display screen 124 is in a position so as to be easily viewable by the driver of the vehicle. The second display screen 124 may be orientated so as to be generally perpendicular to the normal viewing direction of the driver.

As illustrated in FIG. 3, the second display screen 124 is configured to display a second set of vehicle instruments 300a-300c. As per the description of the first display screen 122 above, these vehicle instruments may each display information regarding the operation of the vehicle. The number of vehicle instruments 300 that the second display screen 124 is configured to be capable of displaying is less than the number of vehicle instruments 200 that the first display screen 122 is configured to be capable of displaying.

There are certain key instruments that it is desirable that the driver of the vehicle is able to view. Therefore, in this case, the vehicle instruments that are part of the second set of vehicle instruments may be present in the first set of vehicle instruments. In other words, the reduced subset of vehicle instruments that are displayed on the second display screen may also be present on the first display screen which displays a larger number of vehicle instruments. For instance, it is generally desirable that the current vehicle speed is presented to the driver at all times and so one vehicle instrument that may be present in both the first set and the second set is a speedometer. The second set may comprise: a speedometer, a tachometer, a current selected gear instrument, a gear change indicator instrument.

The use of a first display screen 122 that displays a larger number of vehicle instruments may be more suitable for when the vehicle is being driven normally by the driver. For instance, the first display screen 122 may be capable of displaying information provided by a vehicle navigation system that receives location information from a satellite positioning service. The first display screen 122 may also be capable of displaying information about the exterior surroundings of the vehicle and other information that is generally useful to the driver. The other information may include running information about the vehicle such as average speed, vehicle range or trip distance covered. However, when the vehicle is being driven enthusiastically or under race conditions, this additional information may be distracting to the driver of the vehicle. In such a situation the second display screen 124, with its reduced number of vehicle instruments is advantageous. The second display screen 124, by virtue of only displaying particular key vehicle instruments, provides only the key information that is required by the driver to control the vehicle in an exact, efficient manner. This is particularly desirable when the vehicle is a sports car and is being driven enthusiastically or under race conditions.

There may be certain vehicle information that it is deemed important that it is displayed to the driver of the vehicle at all times. For instance, there may be certain safety information concerning the vehicle that it is deemed important that the driver is aware of at all times. Using the two primary display system described above, certain information provided via the vehicle instruments 200 and 300 are likely to be in different positions depending on whether the first display screen 122 is operational or whether the second display screen 124 is operational. When the information provided by the vehicle instruments is for safety purposes it may be desirable that it is located in the same position irrespective of which of the first display screen 122 and second display screen 124 is acting as the primary vehicle display at any given point. Therefore, the display screen system described herein may also comprise one or more auxiliary display screens.

FIGS. 2 and 3 show a first auxiliary display screen 202 and a second auxiliary display screen 204. As described above, any number of auxiliary display screens may be provided depending on the construction and/or styling of the vehicle interior. Each of the auxiliary display screen(s) may be capable of displaying one or more vehicle instruments 206, 208. These auxiliary display screens are shown as being located on the dashboard, spaced away from the display unit 120. The position of the auxiliary display screen(s) 202, 204 may be fixed relative to the housing of the display unit 120. This may also be described as the position of the auxiliary display screen(s) being fixed relative to the dashboard of the vehicle. The position of the auxiliary display screens may alter as the display unit 120 transitions between the first and second positions, but generally it is desirable that the position of the auxiliary display screens is fixed relative to the vehicle cabin. This is because as described above these auxiliary display screen(s) 202, 204 may be configured to display vehicle instruments 206, 208 that it is desirable that they are displayed to the driver at all times. It is also desirable that the driver knows at all times where in his/her visual range these important vehicle instruments 206, 208 are located.

The one or more auxiliary display screens 202, 204 may be configured to display a third set of vehicle instruments. The third set of vehicle instruments may, at least in part, display information related to the safety of the vehicle and/or the reliable operation of the vehicle. Therefore, the third set of vehicle instruments may be instruments that provide warning lights, status information of vehicle safety systems, and/or status information of key vehicle systems such as: engine temperature and/or oil pressure. The third set of vehicle instruments 206, 208 may include instruments that it is mandated by government legislation are provided to the driver of the vehicle at all times whilst the vehicle is in operation. In at least some implementations, the third set of vehicle instruments 206, 208 may be described as tell tales.

As discussed briefly above, the display unit 120 is capable of moving between a first position and a second position. The movement between the first and second positions may be in the form of a rotation, a translation or a compound motion including both rotation and translation. It is anticipated that the compound motion could include a series of one or more rotations and one or more translations in any order such that the display unit 120 is capable of movement between the desired first and second positions in which the relevant first display screen 122 and second display screen 124 are appropriately orientated. The display unit's motion may need to be designed such that it moves within the constraints of a particular dashboard design or display unit housing design.

Figure 4A:
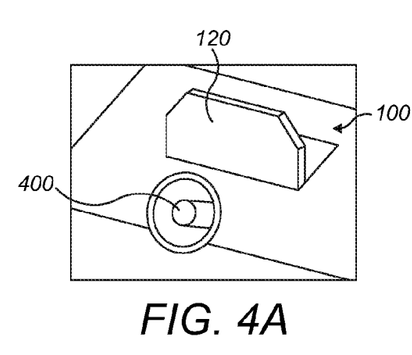
FIGS. 4A to 4C show perspective views of the passenger compartment of the vehicle illustrating the motion of the display unit between the first position and the second position.
Figure 4B:
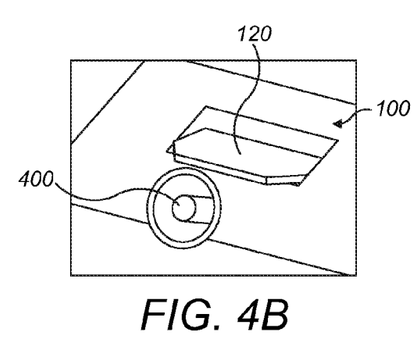
Figure 4C:
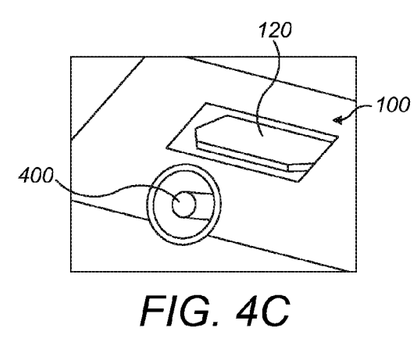
Figure 5A:
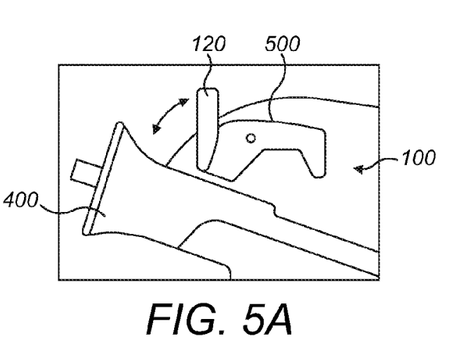
FIGS. 5A to 5C show cross-sectional views along the centreline of the display unit illustrating the motion of the display unit between the first position and the second position.
Figure 5B:
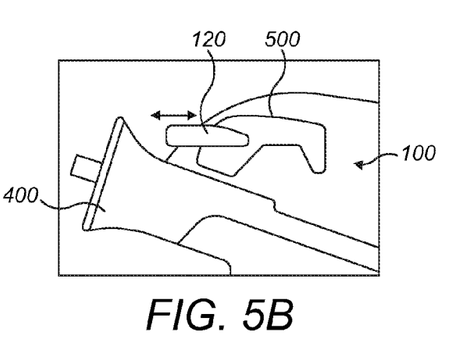
Figure 5C:
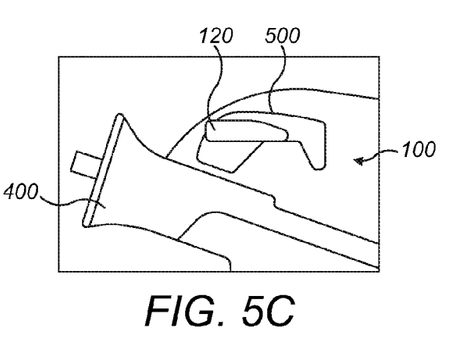

An exemplary movement of the display unit 120 between the first and second positions will now be described with reference to FIGS. 4 and 5. FIGS. 4 and 5 are broken down in to three sub-figures A to C which illustrate the movement of the display unit 120 between the first and second positions. It will be appreciated that the motion from the first position to the second position can be derived from the motion of the display unit 120 between sub-figure A to C and the motion from the second position to the first position can be derived from the motion of the display unit 120 between sub-figure C to A. FIGS. 4A to 4C show perspective views of the passenger compartment of the vehicle illustrating the motion of the display unit between the first position and the second position. FIGS. 5A to 5C show cross-sectional views along the centreline of the display unit illustrating the motion of the display unit between the first position and the second position. In FIGS. 4 and 5 the steering wheel 114 has been omitted for clarity. The steering column 400 is shown instead and designates the general central position of the steering wheel 114. Display unit 120 is shown with first and second display screens omitted for clarity but it will be appreciated that they will be present in display unit 120 as described above with reference to FIGS. 1 to 3.

In the following description the position and motion of the display unit 120 is described relative to the housing of the display unit 120. It will be appreciated that the housing may be formed by part of the dashboard 112 of the vehicle.

FIGS. 4A and 5A show the display unit 120 in the first position relative to the dashboard 100 and/or housing 500. The display unit 120 may be rotatably mounted to the housing such that it can rotate relative to the housing. The display unit 120 may be mounted to the housing such that the display unit 120 can rotate relative to the housing. Thus, during the transition between the first position and the second position the display unit 120 may rotate so that the second display screen is brought into full view of a driver positioned in the driver seat 102 of the vehicle. Thus, the display unit 120 moves to the position shown in FIGS. 4B and 5B where the portion of display unit 120 that comprises the second display screen is in view of a driver positioned in the driver seat of the vehicle. The display unit 120 may also be mounted to the housing so that the display unit 120 can translate relative to the housing. Thus, the display unit 120 can move to the position shown in FIGS. 4C and 5C where the display unit 120 has move from a projecting position relative to the housing to a withdrawn position relative to the housing. The movement of the display unit 120 to a withdrawn position may be beneficial because it may present the second display screen 124 in a position that can be viewed by a driver positioned in the driver seat of the vehicle. The position of the display unit 120 shown in FIGS. 4C and 5C may be the second position. The display unit 120 may be mounted to the housing so that the display unit 120 can rotate but not translate relative to the housing.

The motion of the display unit 120 from the second position to the first position may be the reverse of that described in relation to the motion from the first position to the second position. The display unit 120 may translate relative to the housing from a withdrawn position to an extended position, as shown in the transition between FIGS. 4C, 5C to FIGS. 4B, 4C. The display unit 120 may then rotate relative to the housing 500 to move the first display screen to a position where the first display screen is brought into full view of a driver positioned in the driver seat 102 of the vehicle.

The movement of the display unit may be controlled by a display unit controller 630. In this way, the display unit controller 630 may be configured to cause the display unit 120 to move between the first and second positions. The display unit controller 630 may be configured to control one or more actuators and/or motors that are connected to the display unit to permit the display unit to move between the first and second positions.

The display unit controller 630 may be configured to accept inputs from other vehicle systems. The display unit controller 630 may be connected to the vehicle system bus, for instance the CAN bus, that provides information between the various systems that are capable of running within the vehicle. The display unit controller 630 may also be configured to control the vehicle instruments that are capable of being displayed on the first display screen 122 and second display screen 124. The display unit controller 630 may be capable of receiving vehicle information data and controlling one or more vehicle instruments in response to received vehicle information data. Vehicle information data may be provided in the form of analogue signals where the sensor that provides the information is an analogue sensor that is connected to the display unit controller by means of a wired connection. The display unit controller 630 may be a discrete controller unit or may be part of a vehicle management unit that also provides other vehicle management functions. The display unit controller 630 and the conditions in which it may transition the display unit 120 between the first and second positions will now be explained with reference to FIG. 6.

Figure 6:
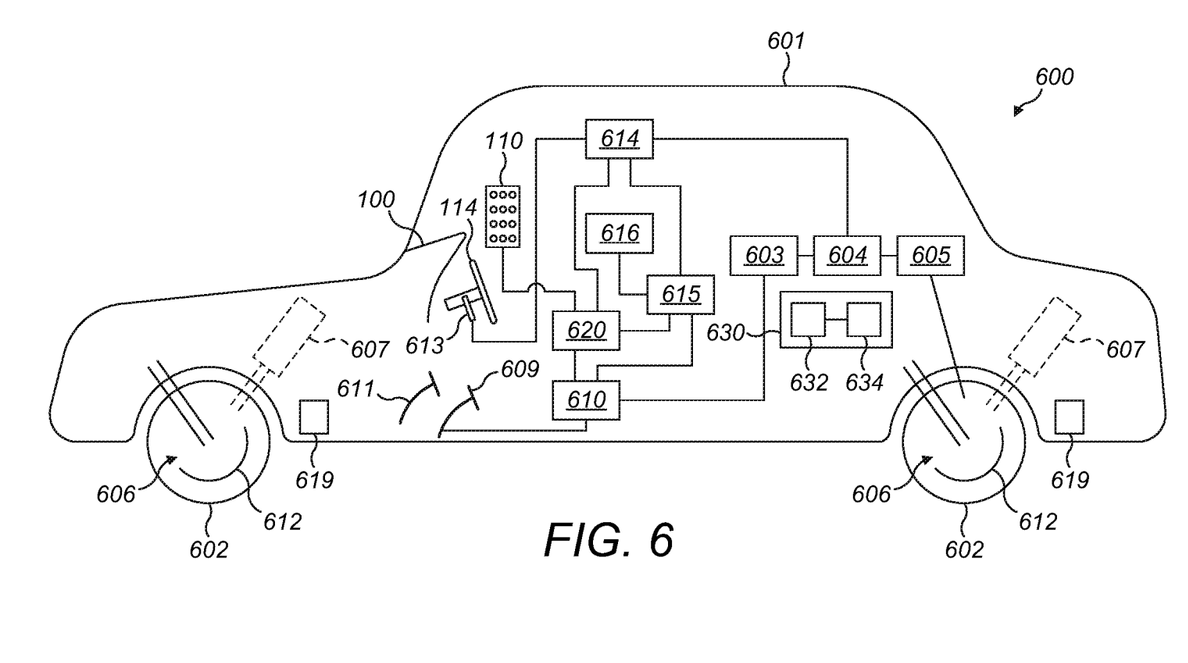
FIG. 6 shows a vehicle, in particular car 600, according to various embodiments.

A vehicle is shown in FIG. 6. The vehicle in FIG. 6 is a car 600. FIG. 6 shows a car 600 having a body 601, wheels 602 and an engine 603. The engine 603 drives the rear wheels through gearbox 604 and a differential 605. The wheels 602 are mounted to the body via a suspension system 606 having a damper 607 at each wheel 602. The driver can steer the front wheels by means of a steering wheel 114.

The driver can control power output by the engine by means of accelerator pedal 609. The position of the accelerator pedal is fed in to an electronic engine management unit (EMU) 610. The EMU takes that input and other inputs, processes them by means of code stored in the EMU and forms outputs that control parameters of the engine such as fuel flow rate and ignition timing, thereby setting the engine's output power.

The driver can brake the car by means of brake pedal 611, which actuates brakes 612 at the wheels. The driver can change gear by means of paddles 613 on the steering wheel 114. The paddles provide inputs to a gearbox controller (GBC) 614, which processes them by means of code stored in the GBC and forms outputs that control the operation of the gearbox 604.

The vehicle has a stability and traction control system implemented by a stability control unit (SCU) 615. The system monitors the yaw of the vehicle by means of yaw sensor 616 and the rotation speed of the wheels by means of speed sensors 619. In dependence on these inputs it can actuate the brakes 612 and/or command the EMU 610.

The car's dynamics can be varied in a number of ways. For example, the way in which the EMU responds to accelerator inputs can be varied so as to make the car more or less sensitive to the accelerator; the speed with which the gearbox changes gear can be altered, as can other characteristics of the gear changes; the suspension's bump and rebound characteristics can be independently altered by adjusting the valving of the dampers 617 (the valves are electrically adjustable); the operational mode of the SCU can be altered, so that it intervenes more or less when the vehicle loses stability.

The vehicle may comprise a dynamics control unit (DCU) 620. The DCU receives inputs from a dynamics user interface, which can be part of the other controls 110 described above, processes those inputs and generates outputs to other components of the vehicle. Those outputs are such as to implement the dynamic settings applied by means of the user interface. In order to generate those outputs the DCU may store and execute code that processes the inputs, and generates the outputs in dependence thereon. Alternatively, (and so for the other devices described herein as operating under software control) the DCU may be implemented in hardware. The vehicle may comprise one or more control units that together provide the described functionality of the DCU 620. For instance, the vehicle may comprise a chassis control unit (CCU) and a transmission control unit (TCU) which together process inputs and generate outputs to other components of the vehicle to adjust the dynamics of the vehicle.

In summary, the vehicle has a number of sub-systems (engine, suspension, gearbox etc.) that can operate in a number of modes that each affect the car's dynamics differently. Those modes may be embodied by a position or physical setting of the respective sub-system or by the adoption of a particular operational strategy by the controller of the respective sub-system. The operating modes of some or all of the sub-systems can be set by the DCU in accordance with the inputs it receives from the driver via its user interface which may be part of controls 110.

The DCU may be configures to accept at least one input from the user interface that permits the driver to select between a number of different dynamic modes. There may be more than one input accepted from the user interface where the dynamic modes of the vehicle are spilt according to different areas of the vehicle's performance. For instance, the settings may be divided between engine dynamics settings and handling dynamics settings. The dynamic modes described above may have a number of possible settings, those settings may be "normal", "comfort", "sport", "track", "race".

The display unit controller 630 may be configured to receive inputs from the DCU which pertain to the current dynamic mode of the vehicle. The display unit controller may be configured to cause the display unit 120 to move to the first position when a first dynamic mode is selected by the DCU. The display unit controller 630 may be configured to move the display unit 120 to the second position in response to a second dynamic mode being selected by the DCU. The first dynamic mode may be a dynamic mode where the vehicle operates in a less aggressive manner, for instance: least accelerator sensitivity, slowest gear shirts, smoothest gear shifts. The first dynamic mode may be described as a "normal" or "comfort" mode or other dynamic mode that prioritises passenger comfort over vehicle performance. The second dynamic mode may be a dynamic mode where the vehicle operates in a more aggressive manner for instance: stiff bump and rebound, more accelerator sensitivity. The second dynamic mode may be described as a "track", "sport" or "race" mode or other dynamic mode that prioritises vehicle performance over passenger comfort. The second dynamic mode may only be when the DCU has selected race mode or another mode where the vehicle operates with in the most aggressive manner. There may be more than one first dynamic mode which means the display unit 120 moves to the first position. These first dynamic modes may for instance be "comfort", "normal", and/or "sport". It may be that only a selection by the DCU of one second dynamic mode causes the display unit controller 630 to cause the display unit 120 to move in to the second position and enable the second display screen as the primary vehicle display. There may be more than one second dynamic mode which means the display unit 120 moves to the second position. These second dynamic modes may for instance be "sport", "track" and/or "race". The second dynamic modes may be different versions of a particular mode, for instance, different versions of a race mode that has different vehicle dynamics settings tuned for particular driving conditions.

As described herein, the first display screen may be configured to display different sets of vehicle instruments at different times. In this case, the first display screen may be configured to display one of a group of first sets of vehicle instruments at a given time. The first display screen may be configured to display a first of the first sets of vehicle instruments when at least one of the first dynamic modes is selected by the DCU and display a second of the first sets of vehicle instruments when at least one other of the first dynamic modes is selected by the DCU.

The first display screen may be configured to change the appearance of the vehicle instruments displayed on the first display screen in dependence on the first dynamic mode selected by the DCU. The first display screen may be configured to display the vehicle instruments with a first appearance when at least one of the first dynamic modes is selected by the DCU and display the vehicle instruments with a second appearance when at least one other of the first dynamic modes is selected by the DCU.

The vehicle may be fitted with a user interface that permits the selection of two or more dynamic modes and the display unit controller 630 may control the position of the display unit 120 based on the selection of a particular dynamic mode. It should be appreciated that the selection of a dynamic mode made not directly change the performance of the operating characteristics of the vehicle but may cause a difference of appearance within the vehicle cabin.

In the above described manner, the display unit 120 is capable of reacting to the driver signalling that the vehicle is to be driven in an enthusiastic manner or under race conditions. In reaction to this signalling, the display unit 120 enters a mode where it shows only those vehicle instruments that are important to driving the car in a high performance manner. The display unit 120 does this by moving to the second position and enabling the display of the second set of vehicle instruments on the second display screen. Thus presenting the driver with a focused driving experience that is important when the vehicle is being driven in a high performance manner.

The display unit controller 630 may comprise a processor 632 and a software memory 634. The processes described as being implemented by the display unit controller 630 may be implemented and controlled by the processor 632. The processor could perform its methods using dedicated hardware, using a general purpose processor executing software code, or using a combination of the two. The processor 632 executes software code stored in a non-transient way in software memory 634 in order to perform its methods.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A display assembly for a vehicle, the display assembly comprising:
   a housing;
   a display unit comprising a first display panel having provided thereon a first set of instruments and a second display panel having provided thereon a second set of instruments, the first set of instruments being positioned perpendicular relative to the second set of instruments, the display unit being moveable, relative to the housing, between a first position and a second position; and
   a display unit controller configured to:
      when the display unit is in the first position, cause the first display panel to display the first set of instruments and, when the display unit is in the second position, cause the second display panel to display the second set of instruments;
      receive a dynamic mode input, the dynamic mode input representing a current dynamic mode of the vehicle; and
      in response to the current dynamic mode being a first dynamic mode, cause the first display panel to move to the first position.

2. A display assembly as claimed in claim 1, wherein the display unit controller is configured to cause the first display panel to operate as the primary display of the vehicle when the display unit is in the first position and cause the second display panel to operate as the primary display of the vehicle when the display unit is in the second position.

3. A display assembly according to claim 1, wherein the first set of instruments includes a duplicate set of the instruments of the second set of instruments.

4. A display assembly according to claim 1, wherein the display unit controller is configured to disable the first display panel when the display unit is in the second position.

5. A display assembly according to claim 1, wherein the display unit controller is configured to disable the second display panel when the display unit is in the first position.

6. A display assembly according to claim 1, wherein the display unit controller is configured to receive vehicle information data and control one or more of the vehicle instruments in response to the received vehicle information data.

7. A display assembly according to claim 6, wherein the vehicle information data is received from a vehicle management unit.

8. A display assembly according to claim 1, wherein the display unit is mounted to the housing to permit rotational movement between the first position and the second position.

9. A display assembly according to claim 1, wherein the display unit is mounted to the housing so that the display unit can translate relative to the housing to permit movement between the first position and the second position.

10. A display assembly according to claim 1, wherein the second set of instruments comprises less vehicle instruments than the first set of instruments.

11. A display assembly according to claim 1, wherein the first dynamic mode is a dynamic mode wherein the vehicle prioritizes passenger comfort over vehicle performance.

12. A display assembly according to claim 1, wherein the first dynamic mode is one of a normal mode or comfort mode.

13. A display assembly according to claim 1, wherein the first dynamic mode is one of a first group of dynamic modes.

14. A display assembly according to claim 1, wherein the display unit controller is configured to receive a dynamic mode input, the dynamic mode input representing the current dynamic mode of the vehicle, and, in response to the current dynamic mode being a second dynamic mode, cause the display panel to move to the second position.

15. A display assembly according to claim 14, wherein the second dynamic mode is a dynamic mode wherein the vehicle prioritizes vehicle performance over passenger comfort.

16. A display assembly according to claim 14, wherein the second dynamic mode is one of a sport mode or a race mode.

17. A display assembly according to claim 1, wherein the dynamic mode input is received from a dynamics control unit of the vehicle.

18. A vehicle comprising:
the display assembly of claim 1; and
a dashboard extending across the interior width of the vehicle;
wherein the display assembly is set within the dashboard.

19. A vehicle according to claim 18, the vehicle comprising a driver seat and wherein the display assembly is located within the normal field of view of a driver positioned in the driver seat.

20. A vehicle according to claim 18, wherein the display unit functions as the primary instrument display of the vehicle.

21. A vehicle according to claim 18, the dashboard comprising a first auxiliary display screen in a fixed position relative to the dashboard, and the auxiliary display screen being capable of displaying a third set of vehicle instruments.

22. A vehicle according to claim 21, wherein the third set of vehicle instruments comprises vehicle instruments that are required to be displayed to the driver at all times.

23. A vehicle according to claim 22, wherein the third set of vehicle instruments are vehicle instruments that are required to be displayed to the driver at all times.

24. A vehicle according to claim 18, the dashboard comprising a plurality of auxiliary display screens and the plurality of auxiliary display screens are each configured to display at least some of the third set of vehicle instruments.

* * * * *